Patented Dec. 15, 1953

2,662,877

UNITED STATES PATENT OFFICE 2,662,877

COPOLYMERS OF ACRYLONITRILE AND ALLYL AMINES

David W. Chaney, Nether Providence Township, Delaware County, Pa., assignor, by mesne assignments, to The Chemstrand Corporation, Decatur, Ala., a corporation of Delaware No Drawing. Application June 27, 1950, Serial No. 170,710

18 Claims. (Cl. 260—85.5)

This invention relates to a new class of inherently dye-receptive polymeric materials.

The new polymeric materials are copolymers of acrylonitrile with allylamines of the formula

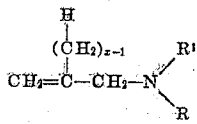

where $x$ is an integer from 1 to 3, and R and $R^1$ each represents an alkyl radical, e. g., a methyl, ethyl, propyl, or butyl radical, an aryl radical, e. g., a phenyl, naphthyl, tolyl, or xylyl radical, or an aralkyl radical, e. g., a benzyl or ethylphenyl radical, and R and $R^1$ may be the same or different, or the two R's taken together represent the divalent residue of a heterocyclic secondary amine, or with the nitrogen oxides or quaternary ammonium salts of the allylamines.

Illustrative allylamines which may be copolymerized with acrylonitrile to produce the new copolymers of the invention are N,N-dimethyl-allylamine, N,N-diethyl-allylamine, N,N-dipropyl-allylamine, N,N-di-isopropyl-allylamine, N,N-dibutyl-allylamine, N,N-di-isobutyl-allylamine, N,N-diphenyl-allylamine, N,N-di-monomethyl-anilino-allylamine, N-allylmorpholine, N-allyl-piperidine, N-allyl-ethyleneimine, N-allyl-pyrrolidine, N,N-dimethyl-methallylamine, N,N-diethyl-methallylamine, N,N-dimethyl-ethallylamine, N,N-diethyl-ethallylamine, N-methallyl-morpholine, etc.

The invention also embraces new copolymers of acrylonitrile and allylamines containing quaternary ammonium groups obtainable by copolymerizing acrylonitrile with an allylamine which has been reacted with a quaternizing agent prior to the copolymerization, or by treating a copolymer of acrylonitrile and the selected allylamine with a suitable quaternizing agent, in solution or in the form of a shaped article. Suitable quaternizing agents are the alkyl iodides, chlorides, and bromides, the arylsulfonates such as benzenesulfonate, p-toluenesulfonate, and methyl-toluene-sulfonate, the alkyl sulfates, such as methylsulfate, ethyl sulfate, n-propylsulfate, n-butylsulfate, etc.

The new copolymers of the invention contain, by weight in the polymer molecule, at least 50 percent of acrylonitrile and at least 1 percent of the allylamine or allylamine oxide or quaternary ammonium salt, and are inherently receptive to the acid type dyestuffs. Preferably, the copolymers contain at least 80 percent by weight of acrylonitrile and at least 1 percent of the allyl-amine, allylamine oxide, or allylamine quaternary salt, have a molecular weight of from at least 10,000 to 250,0000 or higher, and are adapted to be formed into strong, inherently dye-receptive synthetic fibers by conventional wet- or dry-spinning processes.

The new copolymers may be synthesized from mixtures of the monomers by any of the known polymerization procedures including solution polymerization, mass or bulk polymerization, and polymerization in aqueous suspension or emulsion, in the presence of a dispersing or emulsifying agent, the suspension or emulsion being maintained by any agitation method, for example by tumbling in a rotating reactor, or through the use of any suitable rotary stirring device. A wide variety of emulsifying agents may be used. In general, any composition having both hydrophilic and hydrophobic radicals may be used and the expression "emulsifying agent" is intended to include commercial soaps made by the saponification of animal and vegetable oils, such as sodium stearate, potassium laurate, ammonium oleate, and mixtures of these and other salts as they occur in commercially available soaps. Other emulsifying agents are the rosin soaps, the salts of sulfonated hydrocarbons, dialkyl sodium sulfosuccinates, the salts of partial esters of sulfuric acid and high molecular weight alcohols, quaternary ammonium salts such as stearyl dimethyl benzyl ammonium chloride, nonionic emulsifiers such as ethylene oxide condensates of hexitan mono-stearates.

The copolymerization reaction may be catalyzed by means of any free radical-producing catalyst. Suitable catalysts include the water-soluble peroxy compounds for example hydrogen peroxide, sodium peroxide, sodium perborate, sodium persulfate and other alkali metal salts of peroxy acids, or other water-soluble peroxy compounds. Azo catalysts, such as azo-2,2'-diisobutyronitrile may be used advantageously in the copolymerization. A wide variation in concentration of catalyst may be used depending on the temperature of copolymerization, the concentration of monomers in the reaction mass, and the molecular weight desired for the copolymer. From 0.1 to 5 percent by weight of catalyst may be used. In general, it is desirable to have a uniform reaction rate and therefore a substantially uniform concentration of the catalyst is desired throughout the reaction. An approximation of these conditions may be obtained by separately preparing an aqueous solution of the catalyst and adding the solution in increments to the copolymerizing mass periodically throughout the reaction.

The copolymers of the invention may also be produced by redox polymerization in which the copolymerization is conducted at low temperature in the presence of a peroxy type catalyst and a reducing agent which forms a reduction-oxidation system ("redox" system) with the peroxy compounds which accelerate the copolymerization.

The new copolymers can be produced, also, by a special solution polymerization procedure in which the solvent is saturated with a calculated mixture of the monomers, the catalyst, or a portion thereof is added, and the copolymerization is conducted just at reflux temperature in the resulting single phase liquid system by continuously adding a mixture of the monomers, in a predetermined proportion, to the solution at such a rate as to keep the reflux temperature substantially constant. In this manner, the desired uniform concentration of each monomer is maintained in the reactor and the products are substantially homogeneous with respect to both composition and molecular weight. The catalyst solution may be added continuously at a controlled rate to the polymerizing solution to maintain the catalyst concentration constant during the reaction.

In another method of producing the copolymers, all of the allylamine to be copolymerized is dissolved in the solvent, preferably in water, and the acrylonitrile is added continuously to the polymerizing mixture.

In any of the above systems, the copolymerization may be conducted in the presence of molecular weight regulators which act as chain terminators and prevent the formation of very large molecular weight increments. Such regulators are exemplified in the high molecular weight aliphatic mercaptans, such as dodecyl mercaptan, and dithioglycidol, and by carbon tetrachloride.

In the preferred embodiment of the invention, the copolymers contain at least 80 percent of acrylonitrile and at least 1 percent of the allylamine, the allylamine oxide, or the quaternary ammonium salt of the allylamine. The invention includes ternary copolymers containing at least 80 percent of acrylonitrile, at least 1 percent of the allylamine, oxide, or quaternary salt, and at least 1 percent of another unsaturated monomer which is copolymerizable with the acrylonitrile and allylamine, such as, for example, vinyl acetate, vinyl chloride, methacrylonitrile, styrene, acrylic acid, the acrylates, methacrylates, maleic anhydride, etc. Preferred ternary copolymers contain from 80 to 98 percent of acrylonitrile, from 1 to 19 percent of the allylamine, and from 1 to 19 percent of the third monomer.

While the copolymers containing at least 80 percent acrylonitrile in the molecule are fiber-forming and therefore represent a preferred embodiment of the invention, the coplymers containing lesser amounts, down to 50 percent, acrylonitrile are also useful. They may be used, for example, in coating compositions, or in blends with a fiber-forming acrylonitrile polymer which is not dye-receptive, to impart dye-receptivity thereto.

In general, the copolymers are soluble in the known solvents for high acrylonitrile polymers. However, in some instances such solvents act as plasticizers for the copolymers, affording a composition which can be molded into articles of various shapes and sizes. Examples of solvents which may be used to prepare spinning and casting solutions of the new copolymers which are soluble therein to produce solutions of from 5 to 30 percent concentration are N,N-dimethylacetamide, N,N-dimethylformamide, sulfolane, mixtures of nitromethane and formamide, and mixtures of nitromethane and water. Solutions of the soluble copolymers containing at least 80 percent of acrylonitrile can be formed into synthetic fibers by extrusion into an evaporative medium or into a non-solvent for the polymer.

The evaporative medium used in dry-spinning filaments or yarns from solutions of the copolymers may comprise any gaseous or vapor-containing medium which is inert to the copolymer, such as air, nitrogen, steam, etc., or any mixture of such inert media.

The non-solvent which may be used in wet-spinning or wet-casting the solution of the copolymer may be a mixture of water and the spinning solvent, glycerin, isopropanol, a mixture of predominantly aromatic hydrocarbons such as that available commercially under the trade designation Solvesso-100, or any appropriate liquid which is an extractive for the spinning or casting solvent and a non-solvent for the copolymer.

Instead of fibers or films, the new copolymers of acrylonitrile and the allylamine, oxide or quaternary salt may be formed into other shaped articles, such as rods, tubes, sheets, casings, etc.

Except where the copolymerization is conducted in solution at reflux temperature, it may be effected by heating the monomers to 30 to 100° C. in the presence of the catalyst, and may be performed at alkaline or acid pH.

A pH of from 2 to 5 is preferred, and is maintained by the addition to the polymerization mass of an acid or of a salt which liberates an acid under the polymerization conditions.

Further details of the practice of the invention are set forth in the following examples, in which the parts are given by weight.

Example I

To 700 parts of water there were added 17.9 parts of substantially pure N,N-dimethylallylamine, and 31.3 parts of acrylonitrile. Sufficient sulfuric acid was added to adjust the pH to 2, and the solution was heated to reflux (82° C.). A solution of 3.0 parts of potassium persulfate in 50 parts of water was added, after which 100 parts of acrylonitrile were added continuously at a controlled rate to maintain the reflux temperature substantially constant. Addition time, 37 min. As soon as the addition was complete, the copolymer was filtered, washed and dried. Yield, 108 parts of a copolymer which by nitrogen analysis, was found to contain 6.4 percent of N,N-dimethylallylamine by weight in the copolymer molecule, the balance being acrylonitrile. N, 25.76 percent specific viscosity, 0.22 at 0.1 gm. concentration in 100 ccs. of dimethylformamide.

Example II

Films and fibers formed from an 18 percent dimethylacetamide solution of the copolymer of Example I are dyed to a medium shade of red in a dyebath prepared by dissolving 15 percent of 96 percent sulfuric acid, and 2 percent of the acid wool dye Wool Fast Scarlet G Supra (percentages on the weight of the material to be dyed), in water. The articles to be dyed are entered into the bath at 55° C., the bath is brought to the boil in 10 minutes, and boiled for 60 minutes, after which the article is removed from the bath, rinsed, and dried.

Example III

To 700 parts of water there were added 26.4 parts of N-allylpiperidine, and 50 parts of acrylonitrile. The solution was adjusted to a pH of 4 by the addition of a 1:1 aqueous solution of sulfuric acid, and heated to reflux (77° C.). A solution of 3.0 parts of potassium persulfate in 50 parts of water was added. When the temperature reached 80° C., 98 parts of acrylonitrile were added continuously at a rate controlled to maintain the temperature between 80 and 81° C. Addition time, 50 min. The mass was heated for an additional 10 min. after which the copolymer was filtered, washed, and dried. Yield, 105 parts. By nitrogen analysis, the copolymer was found to contain approximately 7 percent of N-allylpiperidine.

Example IV

To 2900 parts of water there were added 45.9 parts of N,N-diethylallylamine and 260.5 parts of acrylonitrile. The solution was adjusted to a pH of 4 by the addition of a 1:1 aqueous solution of sulfuric acid, and heated to reflux (73° C.). A solution of 10.3 parts of potassium persulfate in 100 parts of water was added. The mass was heated at 73° C. for 2 hours, after which the copolymer was filtered, washed, and dried. 235 parts of a copolymer having a specific viscosity of 0.15 at 0.1 gm. concentration in 100 ccs. of dimethylformamide were obtained. By nitrogen analysis, the copolymer was found to contain 5.3 percent of N,N-diethylallylamine, the balance being acrylonitrile.

Films and fibers formed from a dimethylacetamide solution of the copolymer are dyed to a good red shade in the bath and under the conditions described in Example II.

Example V

To 3400 parts of water there were added 53.6 parts of N,N-dimethylmethallylamine and 293 parts of acrylonitrile. The solution was adjusted to a pH of 4 by the addition of a 1:1 aqueous solution of sulfuric acid, and heated to reflux (73° C.). A solution of 5 parts of potassium persulfate in 50 parts of water was added. The mass was heated at 73° C. for one and a half hours, after which the copolymer was filtered, washed, and dried. 212 parts of a copolymer having a specific viscosity of 0.16 at 0.1 gm. concentration in 100 ccs. of dimethylformamide was obtained. By nitrogen analysis, it was found to contain 9 percent of N,N-dimethylmethallylamine, the balance being acrylonitrile.

An 18.5 percent solution of the copolymer in dimethylacetamide was spun (pump speed 9 ml./min.) through a spinneret having 44 holes each 4 mils. in diameter, into isopropanol at 25° C. The fibers were given a 13 inch immersion, withdrawn from the bath, stretched 100 percent between godets at room temperature, washed with water at 66° C., dried, and stretched 100 to 450 percent at 160° C.

These fibers are dyed to a deep red shade, as in Example II.

Example VI

To 725 parts of water there were added 26.4 parts of allyltrimethylammonium chloride (quaternary salt of N,N-dimethylallylamine), and 48 parts of acrylonitrile. The solution was heated to reflux (77° C.) and a solution of 3.0 parts of potassium persulfate in 25 parts of water was added, after which 100 parts of acrylonitrile were added continuously at a rate controlled to maintain the reflux temperature substantially constant at 80° C. The mass was heated for ten minutes after the addition of the acrylonitrile was completed. 125 parts of a copolymer having a specific viscosity of 0.31 at 0.1 gm. concentration in 100 ccs. of dimethylformamide was obtained. N, 25.83 percent. By nitrogen analysis, the copolymer was found to contain 3.5 percent by weight of allyltrimethylammonium chloride, the balance being acrylonitrile. Films formed from an 13.5 percent dimethylacetamide solution of this copolymer are dyed to a good red shade by the procedure of Example II.

Example VII

To 2900 parts of water there were added 45 parts of N,N-dimethylallylamine, 15 parts of vinyl acetate, and 240 parts of acrylonitrile. The solution was titrated to a pH of 4 by the addition of 1:1 aqueous sulfuric acid, and heated to reflux (71° C.). A solution of 12 parts of potassium persulfate in 100 parts of water was added, and the temperature was allowed to rise to 73° C. A mixture of 7.5 parts of vinyl acetate and 142.5 parts of acrylonitrile was then added continuously over a period of 35 minutes at a controlled rate to maintain the temperature at 73° C. 100 parts of water were added, and the mass was heated at 73° C. for one hour. 345 parts of a ternary copolymer having a specific viscosity of 0.210 at 0.1 gm. concentration in 100 ccs. of dimethylformamide was obtained. It contained 11 percent of N,N-dimethylallylamine, by nitrogen analysis.

Example VIII

A 17 percent solution of the ternary copolymer of Example VII was spun into isopropanol at 45° C. through a spinneret having 44 holes each 4 mils. in diameter. The fibers were withdrawn from the bath, stretched 125 percent between godets, washed, dried, and stretched 300 percent at 160° C. The fibers had a tenacity of 4.0 gms./denier; extensibility of 7.2 percent. They were stabilized by relaxation in boiling water in which they shrank about 10 percent. These fibers were dyed to a good deep shade, as in Example II.

Example IX

Fifteen parts of N,N-dimethylallylamine, 85 parts of acrylonitrile, and 0.5 part of methylmethacrylate were dissolved in 950 parts of water. The solution was titrated to pH 4 with sulfuric acid and heated to reflux (73° C.). A solution of 4.0 parts of potassium persulfate in 50 parts of water was added, after which a mixture of 3.0 parts of methylmethacrylate and 97 parts of acrylonitrile was added continuously over a period of 35 minutes at a rate controlled to maintain the temperature at 73° C. The solution became viscous during the addition of the acrylonitrile-methylmethacrylate mixture and after the addition had been continued for 25 minutes, 200 parts of water were added, to dilute the solution and facilitate stirring. As soon as the addition had been completed, the copolymer was separated by filtration, washed, and dried. 94 parts of a copolymer having a specific viscosity of 0.23 at 0.1 gm. concentration in 100 ccs. of dimethylformamide were obtained. N: 24.73 percent; calculated dimethylallylamine content, 6.2 percent.

Films and fibers formed from an 18 percent dimethylacetamide solution of the copolymer are dyed to a good red shade as in Example II.

*Example X*

Fifteen parts of N,N-dimethylallylamine and 85 parts of acrylonitrile were dissolved in 950 parts of water. The solution was adjusted to pH of 4 by the addition of 1:1 aqueous sulfuric acid, and heated to reflux (73° C.). A solution of 4.0 parts of potassium persulfate in 50 parts of water was added. A mixture of 3 parts of styrene and 97 parts of acrylonitrile was then added continuously over a 28 minute period, 100 parts of water being added toward the end of the addition to facilitate stirring. Heating was continued for 5 minutes, and the copolymer was filtered. 88.3 parts of a copolymer having a specific viscosity of 0.31 at 0.1 gm. concentration in 100 ccs. of dimethylformamide were obtained. N: 25.01 percent; calculated composition of the copolymer: 3.4 parts of styrene, 3.1 percent of N,N-dimethylallylamine, and 93.5 percent of acrylonitrile. Films and fibers of the copolymer are dyed to a fair to good shade as in Example II.

*Example XI*

Fifteen parts of N,N-dimethylallylamine, 5.0 parts of methyl acrylate, and 80 parts of acrylonitrile were dissolved in 950 parts of water. The solution was adjusted to a pH of 4 with 1:1 hydrochloric acid, and heated to reflux (73° C.). A solution of 4 parts of potassium persulfate in 50 parts of water was added, and the solution was heated at 73° C. for two hours. 65 parts of a ternary copolymer having a specific viscosity of 0.20 at 0.1 gm. concentration in 100 ccs. of dimethylformamide were obtained. Films formed from a dimethylacetamide solution of the ternary polymer exhibited good dye acceptance when they were dyed in a bath and under the conditions of Example II.

The invention is defined by the appended claims.

I claim:

1. A copolymer containing, by weight in the copolymer molecule, at least 80 percent of acrylonitrile, and at least 1 percent of N,N-dimethylallylamine.

2. A copolymer containing, by weight in the copolymer molecule, at least 80 percent of acrylonitrile, and at least 1 percent of N,N-diethylallylamine.

3. A copolymer containing, by weight in the copolymer molecule, at least 80 percent of acrylonitrile, and at least 1 percent of N-allylpiperidine.

4. A copolymer containing, by weight in the copolymer molecule, at least 80 percent of acrylonitrile and at least 1 percent of N,N-dimethylmethallylamine.

5. A copolymer containing, by weight in the copolymer molecule, at least 80 percent of acrylonitrile, and at least 1 percent of allyltrimethylammonium chloride.

6. A copolymer containing, by weight in the copolymer molecule, about 94 percent of acrylonitrile, and about 6 percent of N,N-dimethylallylamine.

7. A copolymer containing, by weight in the copolymer molecule, about 95 percent of acrylonitrile, and about 5 percent of N,N-diethylallylamine.

8. A copolymer containing, by weight in the copolymer molecule, about 93 percent of acrylonitrile, and about 7 percent of N-allylpiperidine.

9. A copolymer containing, by weight in the copolymer molecule, about 91 percent of acrylonitrile, and about 9 percent of N,N-dimethylmethallylamine.

10. A copolymer containing, by weight in the copolymer molecule, about 96 percent of acrylonitrile, and about 4 percent of allyltrimethylammonium chloride.

11. A shaped article having one dimension large relative to another of its dimensions, said article being composed of the copolymer of claim 14.

12. Oriented fibers composed of the copolymer of claim 14, dyed with an acid dye.

13. A copolymer containing, by weight in the copolymer, (a) at least 50 percent of acrylonitrile; and (b) at least 1 percent of a substance selected from the group consisting of (1) allyl amines having the formula

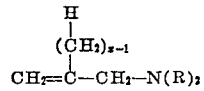

wherein $x$ is an integer from 1 to 3, and R is a substituent selected from the group consisting of alkyl, aryl, and aralkyl radicals, (2) allylamines having the formula

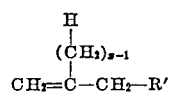

wherein $x$ has the same significance as above and R' represents a radical derived from a heterocyclic secondary amine, the nitrogen of which is directly bonded to the allyl radical, and (3) quaternary ammonium salts of the allylamines.

14. A copolymer containing, by weight in the copolymer molecule, (a) at least 80 percent of acrylonitrile; and (b) at least 1 percent of a substance selected from the group consisting of (1) allyl amines having the formula

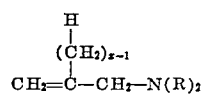

wherein $x$ is an integer from 1 to 3, and R is a substituent selected from the group consisting of alkyl, aryl, and aralkyl radicals, (2) allyl amines having the formula

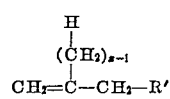

wherein $x$ has the same significance as above and R' represents a radical derived from a heterocyclic secondary amine the nitrogen of which is directly bonded to the allyl radical, and (3) quaternary ammonium salts of said allyl amines.

15. A copolymer consisting of, by weight in the weight in the copolymer molecule, at least about 85 percent of acrylonitrile, and at least 1 percent of allyltrialkyl ammonium chloride.

16. A polymerizable composition comprising (1) acrylonitrile and (2) a quaternary ammonium compound represented by the general formula

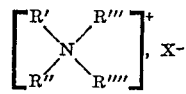

where R', R'', and R''' each represents an alkyl radical, R'''' represents a monoethylenically unsaturated aliphatic hydrocarbon radical having a terminal

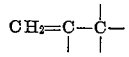

grouping and containing from 3 to 5 carbon atoms, inclusive, and X⁻ represents an anion, the compound of (2) constituting from about 1% to about 15% by weight of the total amount of (1) and (2).

17. A product comprising the polymerized composition of claim 16.

18. A composition comprising a copolymer of a mixture containing (1) acrylonitrile and (2) allyltrialkylammonium salt, the ingredients of (1) and (2) being present in the said mixture in a weight ratio of from about 1% to about 15% of the latter to from about 99% to about 85% of the former.

DAVID W. CHANEY.

References Cited in the file of this patent
UNITED STATES PATENTS

| Number | Name | Date |
|---|---|---|
| 2,172,822 | Tamele et al. | Sept. 12, 1939 |